US005699407A

United States Patent [19]
Nguyen

[11] Patent Number: 5,699,407
[45] Date of Patent: Dec. 16, 1997

[54] METHOD AND SYSTEM FOR IMPLEMENTING EXTENSION PHONE WITHIN A CELLULAR RADIO TELECOMMUNICATIONS NETWORK

[75] Inventor: Viet Anh Nguyen, Montreal, Canada

[73] Assignee: Telefonaktiebolaget LM Ericsson (publ), Stockholm, Sweden

[21] Appl. No.: 411,546

[22] Filed: Mar. 28, 1995

Related U.S. Application Data

[63] Continuation-in-part of Ser. No. 6,057, Jan. 19, 1993, abandoned.

[51] Int. Cl.⁶ .................................................. H04M 11/00
[52] U.S. Cl. ................................................ 379/59; 455/57.1
[58] Field of Search ........................... 455/15, 33.1, 33.2, 455/56.1, 57.1; 379/59, 61, 58

[56] References Cited

U.S. PATENT DOCUMENTS

| | | | |
|---|---|---|---|
| 5,046,082 | 9/1991 | Zicker et al. | 379/59 |
| 5,095,531 | 3/1992 | Ito | 455/33.1 |
| 5,119,502 | 6/1992 | Kallin et al. | 455/34.2 |
| 5,138,650 | 8/1992 | Stahl et al. | 379/61 |
| 5,153,902 | 10/1992 | Buhl et al. | 379/57 |
| 5,257,405 | 10/1993 | Reitberger | 455/33.1 X |
| 5,282,240 | 1/1994 | Buhl et al. | 379/59 |
| 5,301,234 | 4/1994 | Mazziotto et al. | 455/33.1 X |
| 5,387,905 | 2/1995 | Grube et al. | 455/56.1 |
| 5,465,386 | 11/1995 | Barnes et al. | 455/15 |
| 5,475,689 | 12/1995 | Kay et al. | 379/59 X |

FOREIGN PATENT DOCUMENTS

| | | |
|---|---|---|
| 0441370A2 | 8/1991 | European Pat. Off. |
| WO 94/17644 | 4/1994 | WIPO |

*Primary Examiner*—Dwayne Bost
*Assistant Examiner*—Scott Richardson
*Attorney, Agent, or Firm*—Smith & Catlett, P.C.

[57] ABSTRACT

A method and system for providing extension phone service within a mobile radio communication system. The mobile radio communication system includes a home location register (HLR), a plurality of mobile switching centers (MSCs), and a plurality of mobile stations. A single subscriber number is assigned to each one of the plurality of mobile stations. When a call is directed to the single subscriber number, the HLR transmits an individual routing request message to each one of the plurality of MSCs where mobile stations assigned to the single subscriber number are believed to be located. Each of the MSCs pages the mobile stations within its service area. Upon receiving a response from one or more of the paged mobile stations, each of the MSCs establishes voice channels with the responding mobile stations, and alerts the stations' subscribers. The MSCs then report to the HLR which of the alerted subscribers answered the alert. The HLR then selects one of the mobile stations, routes the call to the selected station, and releases the remaining answering mobile stations.

35 Claims, 5 Drawing Sheets

METHOD AND SYSTEM FOR IMPLEMENTING EXTENSION PHONE WITHIN A CELLULAR RADIO TELECOMMUNICATIONS NETWORK

This application is a continuation-in-part of application Ser. No. 08/006,057, filed Jan. 19, 1993, now abandoned entitled "System for Implementing Extension Phones Within a Cellular Radio Telecommunications System", now abandoned.

BACKGROUND OF THE INVENTION

1. Technical Field of the Invention

This invention relates to extension phone service in a telecommunication system, and more particularly, to extension phone service in a mobile telephony system.

2. Description of Related Art

Cellular radio communication service is defined and specified by a plurality of industry standards adopted by groups comprised of both manufacturers and operators of cellular systems. For example, the EIA/TIA requirements as set forth in Standard IS-41-B provide that a call within a cellular radio system is initially routed to a particular mobile switching center (MSC) in accordance with location data identifying the called mobile station (MS) which is stored in the home location register (HLR) of that particular subscriber. Thereafter, paging of the called mobile station takes place in the MSC to which the call is routed and, if the location data stored in the HLR is correct and the mobile station is currently in an active and powered on state, the MS responds to the page and the call will be completed. IS-41-B is hereby incorporated by reference herein.

Another recent EIA/TIA Standard, IS-53, contemplates that extension phones may be provided to mobile stations within the cellular system. In such an implementation, a single directory number (Pilot Director Number) within the system would be associated with two or more individual mobile stations, each of which would have a different mobile identification number (MIN) and a different electronic serial number (ESN). Thus, in order to provide extension phone service, the HLR must keep separate sets of location data for each of the two or more mobile units that have been assigned the same directory number. EIA/TIA Standard IS-53 is hereby incorporated by reference herein.

Although there are no known prior art teachings of a solution to the aforementioned deficiency and shortcoming such as that disclosed herein, U.S. Pat. No. 5,153,902 to Buhl et al. discusses subject matter that bears some relation to matters discussed herein. Buhl discloses a mobile communications system in which a mobile subscriber may roam including a number of exchanges having coverage areas in which the subscriber may roam. An interrogation exchange receives incoming calls to the mobile station and requests information as to the location of the mobile station from its home exchange. A list of a plurality of possible exchanges in which the mobile station may be located is stored in the home exchange. This list is used to supply information as to the location of the mobile station.

The home exchange initiates and coordinates the paging process and reacts according to the outcome of this process. Thus, Buhl discloses a multi-exchange paging system which locates mobile stations more efficiently than prior systems. Buhl, however, does not teach or suggest associating a plurality of mobile stations with a single PDN. Thus, neither Buhl nor the combination of Buhl and IS-53 teach or suggest directing incoming calls using the PDN to a mobile station extension that is attended by a subscriber ready to respond to the call.

It would be a distinct advantage to have a method and system for implementing extension phones for a plurality of mobile stations located within a single MSC or Multiple MSCs. The method and system would use a single Pilot Director Number (PDN) for the plurality of mobile station extensions, and would direct incoming calls using the PDN to a mobile station extension that is attended by a subscriber ready to respond to the call.

SUMMARY OF THE INVENTION

The object of the present invention is to provide an efficient method of implementing mobile extension phone service.

In one aspect, the present invention is a method of providing extension phone service within a mobile radio communication system. The mobile radio communication system includes a home location register (HLR), a plurality of mobile switching centers (MSCs), and a plurality of mobile stations. The extension phone service is implemented by having a single subscriber number assigned to each one of the plurality of mobile stations. The HLR maintains a list of parameters for identifying the assigned plurality of mobile stations and their respective locations within the network. Each one of the parameters within the list identifies one of the plurality of mobile stations and one of the plurality of MSCs in which the identified mobile station is believed to be currently located. A call directed to the single subscriber number is received in a gateway MSC which, in turn, sends a location request message to the HLR. In response to the location request message, the HLR transmits an individual routing request message to each one of the plurality of identified MSCs for the subscriber number. Each one of the plurality of MSCs receiving a routing request message pages each one of the plurality of assigned mobile stations within its service area. Upon receiving a response from one of the plurality of paged mobile stations, each one of the paging MSCs establishes a voice channel with the responding mobile station and alerts the responding mobile station, preferably with a distinctive ring so that the subscriber knows that this is an extension phone call.

If a subscriber is present and answers the call, then the subscriber is put on hold while the MSC returns the result to the HLR. If more than one MSC returns a result to the HLR (indicating that more than one subscriber answered the call), then the HLR selects a single subscriber to complete the call, based on a single one of the following possible criteria:

1. First-come, first-served;
2. Geographic distance from the calling party; or
3. Charging rates.

The HLR then orders the MSC to disconnect the other, non-selected subscribers. The call is then routed to the selected subscriber.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention implements extension phone service within a mobile telephony system whereby an alert signal ring is sent to all mobile stations associated with a Pilot Director Number (PDN) before routing calls from a G-MSC to the terminating V-MSCs. The present invention eliminates the problems which arise under existing solutions which route the calls prior to subscribers answering. The existing problems include (i) routing calls to unavailable subscribers, (ii) routing calls to busy subscribers, and (iii) consumption of a large number of voice circuits and related hardware and software resources.

Figure 1:
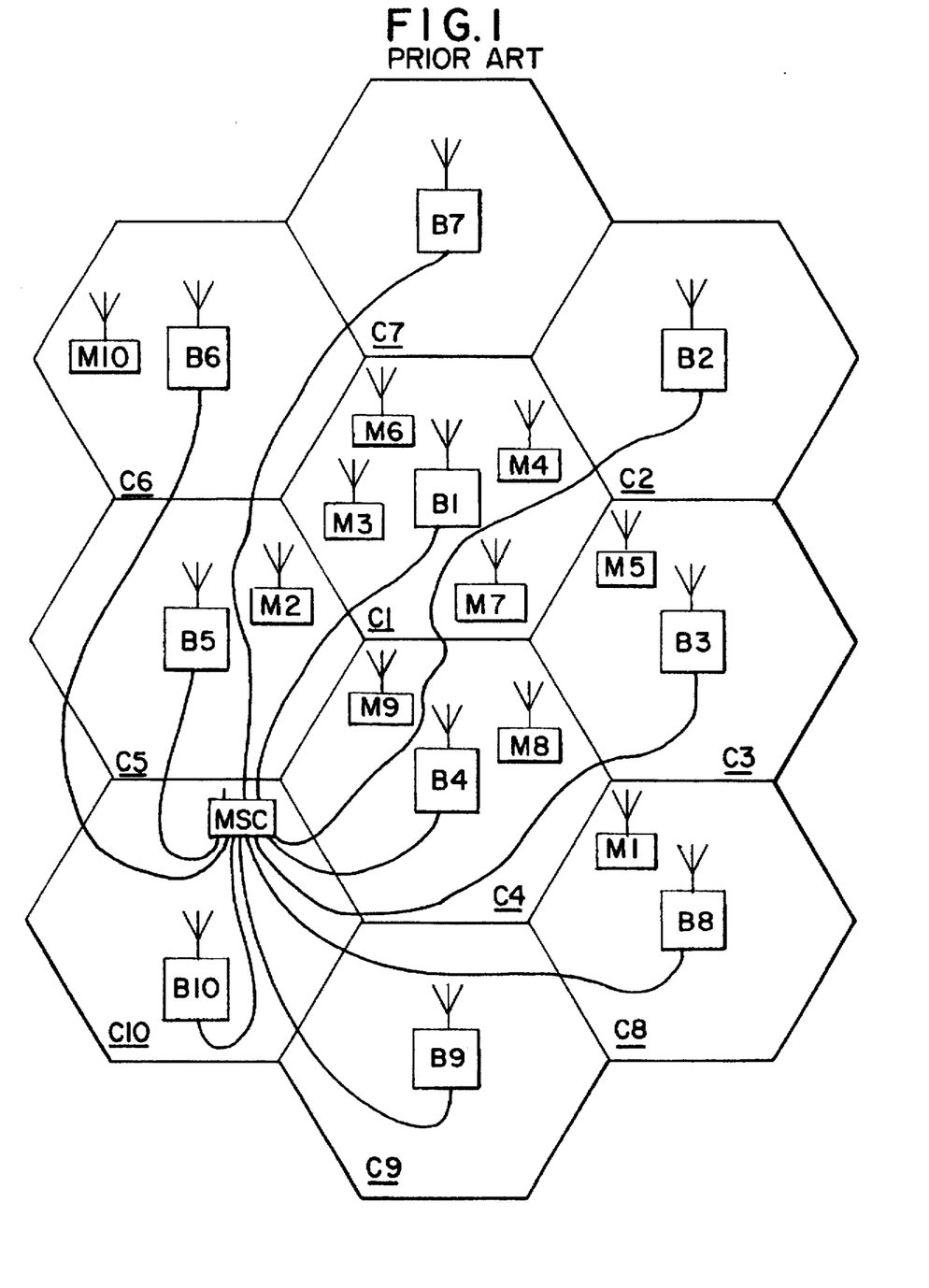
FIG. 1 (Prior Art) is an illustrative representation of a cellular radio communication system including a mobile switching center, a plurality of base stations, and a plurality of mobile stations.

Referring first to FIG. 1, there is illustrated a conventional cellular radio communications system of the type to which the present invention generally pertains. In FIG. 1, an arbitrary geographic area may be divided into a plurality of continuous radio coverage areas, or cells C1–C10. While the system of FIG. 1 is illustratively shown to include only 10 cells and 1 MSC, it should be clearly understood that in practice, the number of MSCs and cells within each MSC will be much larger.

Associated with and located within each of the cells C1–C10 is a base station assigned as a corresponding one of a plurality of base stations B1–B10. Each of the base stations B1–B10 include a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the system of the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and, in addition, from one cellular radio system served by a particular MSC to another such system served by a different MSC.

Each of the mobile stations M1–M10 is capable of initiating or receiving a telephone call through one or more of the base stations B1–B10 and a mobile switching center MSC. A mobile switching center MSC is connected by communication links, e.g., cables, to each of the illustrative base stations B1–B10 and to the fixed public switched telephone network PSTN, not shown, or a similar fixed network which may include an integrated services digital network (ISDN) facility. The MSC shown is also connected to other MSCs making up the cellular radio system network. The relevant connections between the mobile switching center MSC and the base stations B1–B10, or between the mobile switching center MSC and the PSTN or ISDN and other MSCs, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1–C10 is allocated a plurality of voice or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments and maintenance instructions. The control or voice channels may operate either in an analog or digital mode or a combination thereof.

Figure 2:
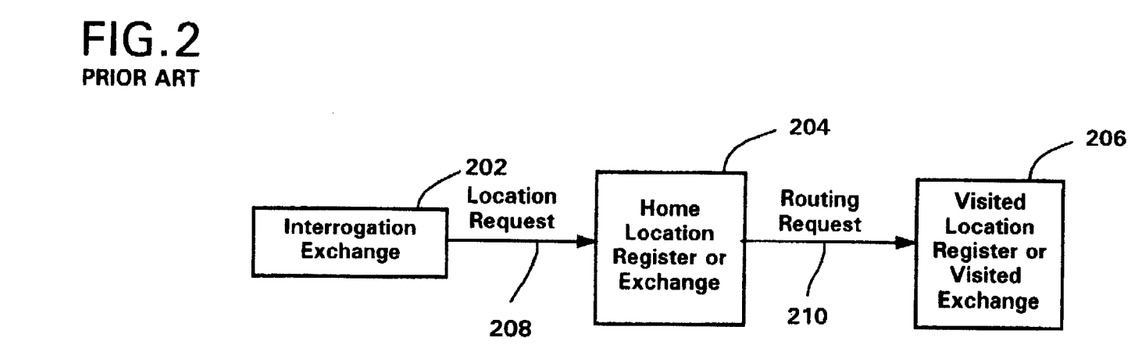
FIG. 2 (Prior Art) is a block diagram illustrating the procedures for the routing of calls within a cellular radio telecommunications system in accordance with prior art routing standards.

Referring next to FIG. 2, there is shown a block diagram of a portion of a cellular radio system illustrating the routing of incoming calls within that system in accordance with the procedures of the EIA/TIA IS-41 standard. In such call completion procedures, a call received for a directory number assigned to a mobile station is received at an interrogation exchange 202 which sends a location request signal 208 to the home exchange or home location register (HLR) 204 associated with the mobile station to which the call is directed. The home exchange or HLR 204 consults its database to determine the current physical location of the mobile station assigned to the directory number being called, and identifies a particular visited exchange or visited location register 206 within the system as the current location of the called mobile station. A routing request 210 is sent to the visited location register or visited exchange 206.

Figure 3:
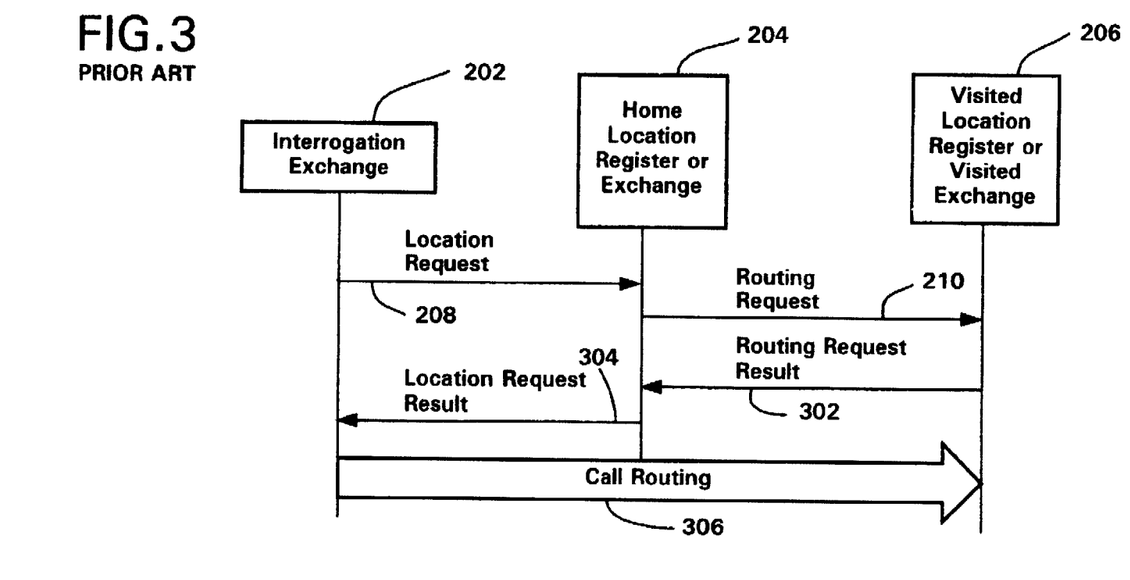
FIG. 3 (Prior Art) is a message exchange diagram illustrating in more detail the procedures for the routing of a call of FIG. 2 within a cellular radio telecommunications system in accordance with prior art routing standards.

Referring next to FIG. 3, there is shown a message exchange diagram which illustrates in more detail the call completion procedures of FIG. 2. The visited location register (VLR) or visited exchange 206 sends a routing request return result 302 to the HLR 204, such message including a temporary routing number. The HLR 204 forwards the temporary routing number in a location request return result message 304 to the interrogation exchange 202. The call is then routed to the current location of the mobile 306 where it is paged and the call completed to the mobile if it responds to the page.

As illustrated in FIGS. 2 and 3, paging of a mobile station in accordance with IS-41 does not occur until after the call has been routed to the visited exchange. The latest version of IS-41 additionally allows for paging the mobile station prior to routing the call. However, even if paging occurs prior to routing, the existing system does not become aware of the availability of the subscriber because receipt of a page response from the mobile station does not indicate that the subscriber is available to answer.

Existing systems may page for all mobile stations on the extension list, and the MSCs where page responses are received return the results to the HLR. The HLR then selects and routes the call to one of the responding MSCs. This may result, however, in a "ringing" of a mobile station without the presence of a subscriber, or a subscriber may have begun using the mobile station during the routing of the call resulting in a busy signal. In either case, the call must be re-routed to another of the responding mobile stations. Such a process is highly cumbersome, slow, and inadequate to serve the needs of the cellular communications industry. In the system of the present invention, when a call directed to a mobile subscriber is received at an interrogation exchange, the HLR of that subscriber is consulted to obtain information identifying the MSC serving the present location of the subscriber. That visited MSC (V-MSC) is then requested to page the mobile station, and, if it responds to the page, connect the mobile station on a voice channel and alert the subscriber. If the subscriber answers, the subscriber is put on hold, and the V-MSC returns the result to the HLR. The HLR selects one of the results and routes the call to the selected subscriber. Thus, the call is never routed to the V-MSC if(i) the mobile station fails to respond to the page attempt; (ii) the subscriber is using the phone and a busy signal is returned; or (iii) the subscriber is not available, and there is no answer to the alert signal. Therefore, substantial time and network resources are saved because calls are not routed unless a subscriber has answered. In this way, the system of the present invention provides efficient implementation of extension phone service within a cellular radio telephone system.

In the present system, a home location register (HLR) maintains location data independently for each mobile station within a group of mobile stations assigned to the same PDN. Upon the receipt of a call to be terminated to that PDN, the interrogation exchange requests the V-MSCs, identified in the HLR location data corresponding to the believed current location of each mobile station, to page each mobile station in accordance with each mobile station's mobile identification number (MIN) and electronic serial number (ESN). All of the V-MSCs then page the relevant mobile stations in a quasi-simultaneous fashion regardless of their proximity to or separation from one another. Since each mobile station being paged is identified by a separate MIN and ESN, all of the mobile stations associated with the PDN may be located in the same MSC and paged there simultaneously. Similarly, all mobile stations may be located in different V-MSCs and each paged separately in their respective MSC. All paging requests from the interrogation exchange to the V-MSCs are treated independently from one another since each mobile station is identified by a specific MIN/ESN combination, or by specific data used on the air interface of the system.

After the page attempts have been executed, any paging V-MSC that was unable to receive a page response from a paged mobile station reports the non-response condition to the HLR. The HLR immediately stops the process for non-responsive mobile stations. All other paging V-MSCs that received a page response then establish a radio voice channel connection with their responding mobile stations and attempt to alert the subscribers. For subscriber convenience, a distinctive ringing tone, voice message, or short message service (SMS) message may be employed to notify the mobile subscriber that the call being placed is a PDN call. Each responding mobile subscriber that answers is temporarily put on hold. The V-MSCs report to the HLR any mobile stations that do not answer or that return a "busy" signal. The HLR immediately stops the process for these unanswering or busy mobile stations. During the time period that the answering subscribers are on hold, their associated V-MSC reports their routing number to the HLR. After a predetermined period of time, the HLR selects one of the reported routing numbers for routing the call according to a predetermined criterion. Once the routing number has been selected, the HLR releases all other non-selected answering mobile subscribers from hold. The HLR then returns the routing number to the interrogation exchange so that the interrogation exchange can then route the call to the V-MSC of the selected number.

Figure 4A:
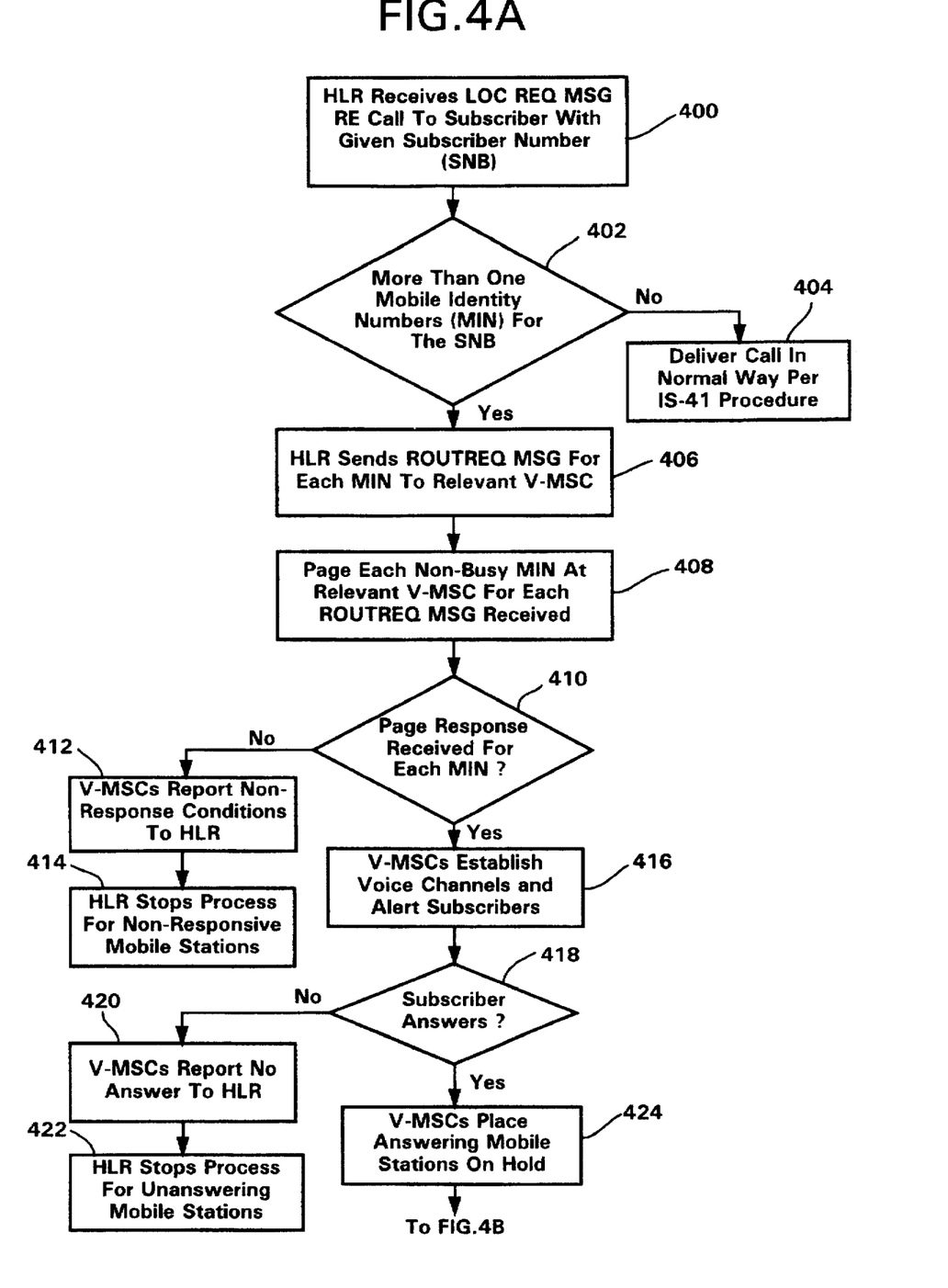
FIGS. 4A-4B are a flow chart illustrating cellular extension service provided in accordance with the teachings of the present invention.
Figure 4B:
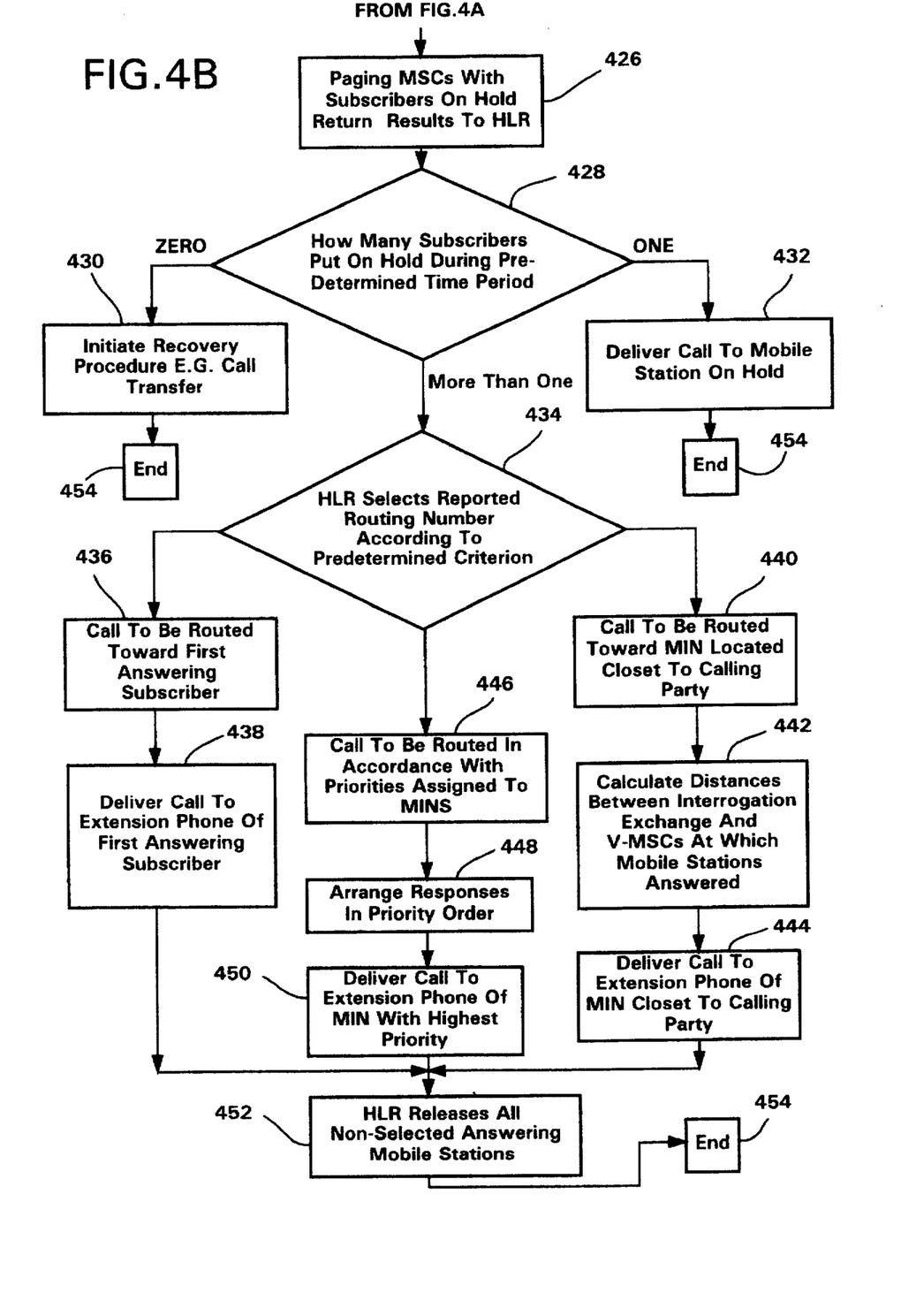

Referring next to the flow chart shown in FIGS. 4A–4B there is illustrated a procedure by which extension phones within a cellular radio system may be implemented in accordance with the teachings of the present invention. In FIG. 4A, the system receives at 400 a location request message regarding a call to a subscriber with a given subscriber number (PDN). At 402, the system determines whether or not more than one mobile identification number (MIN) exists for the subscriber number to which the call is directed. If it is determined that a single MIN exists, then the system moves to 404 where the call is delivered to the mobile station corresponding to the MIN assigned to the subscriber number to which the call is directed and in accordance with the procedure, for example, specified in EIA/TIA IS-41. If, however, it is determined a plurality of MINs exist for the subscriber number, then the system moves to 406 where the HLR of the subscriber number sends a routing request message for each MIN to the Visiting Location Register (VLR) or visited MSC (V-MSC) identified in the HLR database as being the current location of each of the mobile stations corresponding to each MIN assigned to that subscriber number. At 408, each non-busy mobile station corresponding to each MIN is then paged at the relevant V-MSC for each of the routing messages received by it from the HLR. At 410, the V-MSCs determine whether a page response was received in response to the routing request messages it sent to each V-MSC identified as the current location of a mobile station corresponding to each MIN. For those MINs that do not respond, the V-MSCs report the non-response condition to the HLR at step 412. At step 414, the HLR immediately stops the process for the non-responsive mobile stations. For those MINs for which a page response was received at step 410, the system moves to step 416 where the V-MSCs establish voice channels with the responding mobile stations and alert the subscribers. The MSCs may transmit an alerting signal that results in a distinctive ring, a voice message, or a short message service (SMS) message to the subscriber.

At step 418, each of the V-MSCs determines whether each of the alerted subscribers answered. For those subscribers who do not answer because they are not available, the V-MSCs report the no answer condition to the HLR at step 420. At step 422, the HLR stops the process for the unanswering mobile stations. For those subscribers who answered at step 418, the system moves to step 424 where the V-MSCs place the answering mobile stations on hold. The system then moves to step 426 in FIG. 4B.

At step 426, the paging V-MSCs with subscribers on hold return the results to the HLR. At step 428, the HLR takes one of three steps, depending on the number of subscribers put on hold during a pre-determined time period. If zero (0) subscribers were put on hold, the system moves to step 430 where recovery procedures (e.g., call transfer to another number or a no response message to the calling party) are initiated. The process then ends at step 454. If one (1) subscriber was put on hold, the system moves to step 432 where the call is delivered to the mobile station on hold. The process then ends at step 454. If more than one subscriber was put on hold, the system moves to step 434 where the HLR selects a reported routing number from those subscribers on hold.

The routing number is selected according to a predetermined criterion. The system moves to step 436 if the call is to be routed to the first subscriber to answer the call. At step 438, the call is then delivered to the first subscriber to answer the call. If, however, the call is to be routed to the MIN located the closest to the calling party, then the system moves from step 434 to step 440. At step 442, the system calculates the distance between the interrogation exchange and the V-sMSCsat which mobile stations answered. This can be implemented by means of a lookup table or a predefined algorithm driven by the location of the interrogating exchange and the location of the various MSCs. The system then moves to step 444 where the call is delivered to the extension phone of the MIN closest to the calling party. This technique of call routing may be particularly applicable in the case of emergency services such as police, fire, ambulance, etc. If, however, the call is to be routed in accordance with priorities assigned to MINs, the system moves from step 434 to 446. The system then arranges the responses in priority order at 448 and delivers the call to the extension phone of the MIN with the highest priority at 450.

Following the delivery of the call, either to the first mobile station to respond to the page, the closest mobile station to the calling party, or the highest priority mobile station, the system moves to step 452 where the HLR releases all of the answering mobile stations that were not selected by the HLR to receive the call. The process then ends at step 454.

DETAILED EXAMPLE

Figure 5:
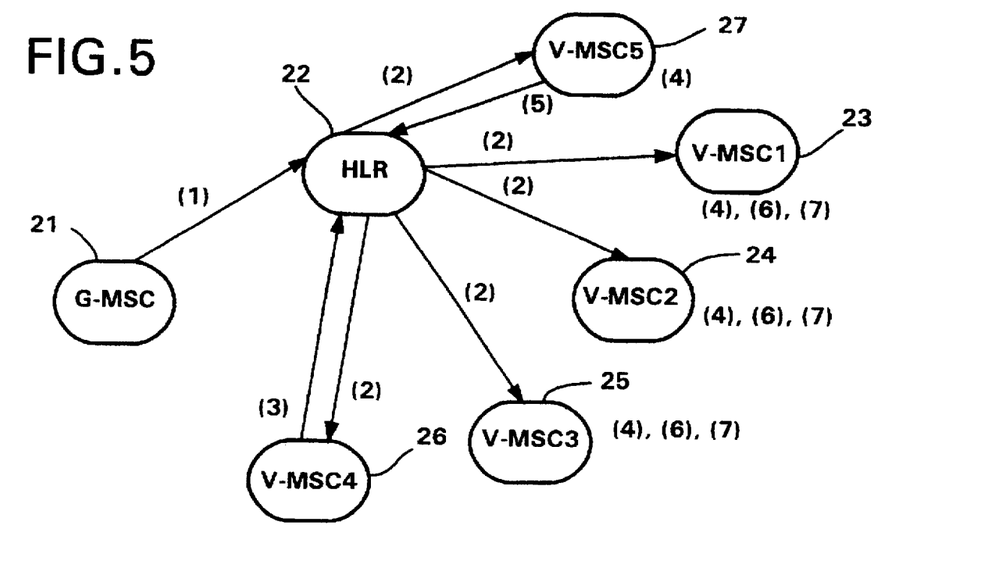
FIG. 5 is a message flow diagram illustrating an example of messages for implementing extension phones in a cellular radio system having a gateway mobile switching center (G-MSC) 21, a home location register (HLR) 22, and a plurality of visited mobile switching centers (V-MSCs) 23–27 in accordance with the teachings of the present invention.

FIG. 5 is a message flow diagram illustrating an example of messages for implementing extension phones in a cellular radio system having a G-MSC 21, an HLR 22, and a plurality of V-sMSCs 23–27 in accordance with the teachings of the present invention. Upon the receipt of a call to be terminated in a group of mobile stations associated with a PDN, the G-MSC 21 of the calling station sends a location request message 1 to the HLR 22. The HLR 22, in turn, transmits routing request messages 2 to all V-MSCs 23–27 where the mobile stations may be located. If an associated mobile station in, for example, V-MSC4 26 is busy, then V-MSC4 notifies the HLR 22 of the "busy" condition at 3. The calling process for that mobile station is then terminated. On the other hand, if a V-MSC has one or more non-busy associated mobile stations in its coverage area, then the V-MSC sends out paging signals to the mobile stations at 4. If there is no page response from a mobile station in, for example, V-MSC5 27, then V-MSC5 notifies the HLR 22 of the "non-responding" condition at 5, and the calling process for that station is terminated.

Thus, entire V-MSCs may be terminated from the calling process if all the associated mobile stations in a V-MSC are busy, or if none of the non-busy mobile stations responds to a page from the V-MSC.

If the remaining mobile stations answer the pages, then their respective V-MSCs, for example V-MSC1-3, connect radio voice channels to the mobile stations at 6. V-MSC1–V-MSC3 then send an alert message (that is, the ringing tone) to the mobile stations at 7. For user convenience, a distinctive ringing tone may be employed to signify that the call being placed is a PDN call instead of a normal call.

Figure 6:
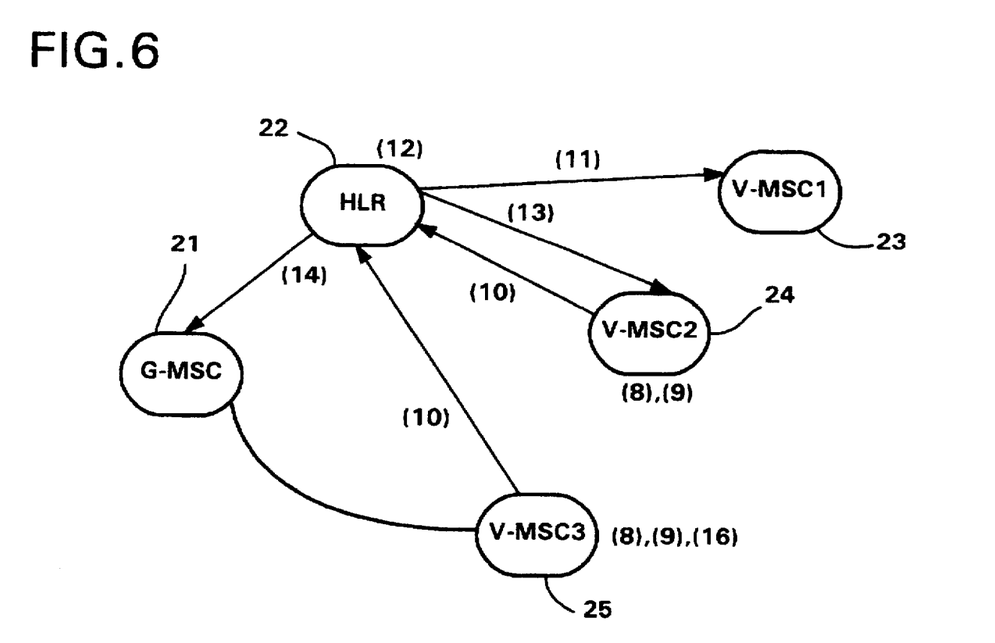
FIG. 6 is a message flow diagram illustrating the flow of messages for implementing extension phones within the cellular network of FIG. 5 after alert messages have been sent to mobile stations in accordance with the teachings of the present invention.

FIG. 6 is a message flow diagram illustrating the flow of messages for implementing extension phones within the cellular network of FIG. 5 after the alert messages have been sent to the plurality of mobile stations in the V-MSCs of FIG. 5 according to the teachings of the present invention. If the subscribers of terminating mobile stations in, for example, V-MSC2 and 3 answer the phone in response to the ringing tone at 8, V-MSC2 24 and V-MSC3 25 first put the subscriber on hold at 9, and then return the subscriber's roamer routing number at 10 to the HLR 22. On the other hand, if a terminating subscriber in, for example V-MSC1, does not answer the call, that mobile station is removed from the calling process by the HLR at 11 after a predetermined period. Upon the receipt of the roamer routing numbers, the HLR 22 selects one routing number at 12 based on a selection criterion such as (i) first to answer; (ii) nearest location; or (iii) a pre-defined priority algorithm.

Once a roamer routing number is selected, the HLR 22 releases, at 13, the other mobile stations not selected (in this case V-MSC2), and returns the selected roamer routing number, at 14, to the G-MSC 21 of the calling station. At 15, the G-MSC routes the call to the V-MSC of the selected roamer number, for example V-MSC3, which in turn sets up the call for conversation at 16.

Several advantages of the cellular extension phone service of the present invention are readily apparent. First, since the V-sMSCsreturn roamer routing numbers to the HLR only after the terminating subscribers have answered the call in response to the ringing tone, the possibility of routing the call only to find that there is no subscriber to pick up the phone is avoided. Second, because the V-MSCs are directed to put the answering subscribers on hold, there is no possibility of their engaging in another call while the PDN call is being routed from the G-MSC to the selected V-MSC. Moreover, as mentioned in the foregoing, since there are two "screening" mechanisms at an early stage of the call set up to terminate "busy" subscribers and "non-responding" subscribers, the possibility of using large amounts of system resources is also eliminated.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of providing extension phone service within a mobile radio communication system having an interrogation exchange, a home location register (HLR), a plurality of mobile switching centers (MSCs), and a plurality of mobile stations, each one of said plurality of mobile stations being assigned to a single subscriber number, said method comprising the steps of:

receiving a call from the interrogation exchange directed to said single subscriber number; transmitting an individual paging message simultaneously to each one of said plurality of mobile stations;

establishing a voice channel with each one of said plurality of mobile stations that responded to said individual paging message;

sending a ringing signal to each one of said plurality of mobile stations having an established voice channel;

determining which ones of said plurality of mobile stations answered said ringing signal; and selectively routing and delivering said call to a single one of said plurality of mobile stations that answered said ringing signal.

2. The method of claim 1 further comprising the step of terminating said established voice channel for each one of said plurality of mobile stations that answered said ringing signal and were not selected and to which said call was not routed.

3. The method of claim 1 wherein said step of sending a ringing signal includes sending a distinctive ringing signal for indicating that said call is an extension phone call.

4. The method of claim 1 wherein said step of selectively routing said call includes routing said call in accordance with a set of predefined criteria.

5. The method of claim 1 further comprising the step of storing in said HLR an individual priority indication for receiving said call for each one of said plurality of mobile stations.

6. The method of claim 5 wherein said step of selectively routing said call includes the step of routing said call to one of said plurality of mobile stations that answered said ringing signal and having a highest individual priority indication stored in said HLR.

7. The method of claim 6 further comprising the step of placing on hold each one of said plurality of mobile stations that answered said ringing signal.

8. The method of claim 1 further comprising the step of storing in a geographic database a table of geographic relationships for said interrogation exchange and said plurality of MSCs.

9. The method of claim 8 wherein said step of selectively routing said call includes the steps of:

consulting said table of geographic relationships to determine which one of said plurality of mobile stations that answered said ringing signal is geographically closest to said interrogation exchange; and routing said call to said geographically closest mobile station.

10. The method of claim 1 further comprising the step of storing an algorithm for calculating geographic relationships between said interrogation exchange and said plurality of MSCs.

11. The method of claim 10 wherein said step of selectively routing said call includes the steps of:

calculating with said algorithm the respective distances between said interrogation exchange and each one of said plurality of MSCs having an established voice channel with one of said plurality of mobile stations; and routing said call to one of said plurality of mobile stations which is geographically closest to said interrogation exchange.

12. The method of claim 1 further comprising the step of storing in a database a table of charging rates.

13. The method of claim 12 wherein said step of selectively routing said call includes the steps of:

consulting said table of charging rates to determine which one of said plurality of mobile stations that answered said ringing signal has the lowest charging rate from said interrogation exchange; and routing said call to said mobile station with the lowest charging rate.

14. The method of claim 1 further comprising the step of storing an algorithm for calculating charging rates between said interrogation exchange and said plurality of MSCs.

15. The method of claim 14 wherein said step of selectively routing said call includes the steps of:

calculating with said algorithm the respective charging rate said interrogation exchange and each one of said plurality of MSCs having an established voice channel with one of said plurality of mobile stations; and routing said call to one of said plurality of MSCs with the lowest charging rate.

16. The method of claim 1 further comprising the step of sending a voice message to each one of said plurality of mobile stations having an established voice channel, said voice message identifying said call as an extension phone call.

17. The method of claim 1 further comprising the step of sending a short message service (SMS) message to each one of said plurality of mobile stations having an established voice channel, said SMS message identifying said call as an extension phone call.

18. A system for providing extension phone service within a mobile radio communication network having an interrogation exchange, a home location register (HLR), a plurality of mobile switching centers (MSCs), and a plurality of mobile stations, each one of said plurality of mobile stations being assigned to a single subscriber number, said system comprising: means for receiving a call from the interrogation exchange directed to said single subscriber number;

means for transmitting an individual paging message simultaneously to each one of said plurality of mobile stations;

means for establishing a voice channel with each one of said plurality of mobile stations that responded to said individual paging message;

means for sending a ringing signal to each one of said plurality of mobile stations having an established voice channel;

means for determining which ones of said plurality of mobile stations answered said ringing signal; and means for selectively routing and delivering said call to a single one of said plurality of mobile stations that answered said ringing signal.

19. The system of claim 18 further comprising means for terminating said established voice channel for each one of said plurality of mobile stations that answered said ringing signal and were not selected and to which said call was not routed.

20. The system of claim 18 wherein said ringing signal is a distinctive ringing signal for indicating that said call is an extension phone call.

21. The system of claim 18 wherein said means for selectively routing said call includes means for routing said call in accordance with a set of predefined criteria.

22. The system of claim 18 further comprising an individual priority indication stored in said HLR, said individual priority indication indicating for each one of said plurality of mobile stations, a priority for receiving said call.

23. The system of claim 22 wherein said means for selectively routing said call includes means for routing said call to one of said plurality of mobile stations that answered said ringing signal and having a highest individual priority indication stored in said HLR.

24. The system of claim 23 further comprising means for placing on hold each one of said plurality of mobile stations that answered said ringing signal.

25. The system of claim 18 further comprising a table of geographic relationships between said interrogation exchange and said plurality of MSCs.

26. The system of claim 25 wherein said means for selectively routing said call includes:
   means for consulting said table of geographic relationships to determine which one of said plurality of mobile stations that answered said ringing signal is geographically closest to said interrogation exchange; and
   means for routing said call to said geographically closest mobile station.

27. The system of claim 18 further comprising means for storing an algorithm for calculating geographic relationships between said interrogation exchange and said plurality of MSCs.

28. The system of claim 27 wherein said means for selectively routing said call includes:
   means for calculating with said algorithm the respective distances between said interrogation exchange and each one of said plurality of MSCs having an established voice channel with one of said plurality of mobile stations; and
   means for routing said call to one of said plurality of mobile stations which is geographically closest to said interrogation exchange.

29. The system of claim 18 further comprising a table of charging rates.

30. The system of claim 29 wherein said means for selectively routing said call includes:
   means for consulting said table of charging rates to determine which one of said plurality of mobile stations that answered said ringing signal has the lowest charging rate from said interrogation exchange; and
   means for routing said call to said mobile station with the lowest charging rate.

31. The system of claim 18 further comprising means for storing an algorithm for calculating charging rates between said interrogation exchange and said plurality of MSCs.

32. The system of claim 31 wherein said means for selectively routing said call includes:
   means for calculating with said algorithm the respective charging rate said interrogation exchange and each one of said plurality of MSCs having an established voice channel with one of said plurality of mobile stations; and
   means for routing said call to one of said plurality of MSCs with the lowest charging rate.

33. The system of claim 18 further comprising means for sending a voice message to each one of said plurality of mobile stations having an established voice channel, said voice message identifying said call as an extension phone call.

34. The system of claim 18 further comprising means for sending a short message service (SMS) message to each one of said plurality of mobile stations having an established voice channel, said SMS message identifying said call as an extension phone call.

35. A method of providing extension phone service within a mobile radio communication system having an interrogation exchange, a home location register (HLR), a plurality of mobile switching centers (MSCs), and a plurality of mobile stations, said method comprising the steps of:
   assigning a single subscriber number to each one of said plurality of mobile stations;
   maintaining a list of parameters within said HLR for said single subscriber number, each one of said parameters identifying one of said plurality of mobile stations, and one of said plurality of MSCs in which said identified mobile station is believed to be currently located;
   receiving a call directed to said single subscriber number in said HLR;
   transmitting, from said HLR, an individual routing request message to each one of said plurality of identified MSCs for the subscriber number;
   paging each one of said plurality of identified mobile stations with said plurality of identified MSCs;
   establishing in said plurality of identified MSCs voice channels with each one of said plurality of identified mobile stations that responded to said page;
   sending an alert signal from each of said identified MSCs to each one of said plurality of identified mobile stations with an established voice channel;
   determining which ones of said plurality of identified mobile stations answered said alerting signal;
   receiving, in said HLR, a response from each one of said plurality of MSCs identifying which ones of said plurality of identified mobile stations answered said alerting signal; and
   selectively routing and delivering said call to a single one of said plurality of responding mobile stations utilizing a predefined set of criteria.

* * * * *

UNITED STATES PATENT AND TRADEMARK OFFICE
CERTIFICATE OF CORRECTION

PATENT NO. : 5,699,407

DATED : December 16, 1997

INVENTOR(S) : Viet Anh Nguyen

It is certified that error appears in the above-identified patent and that said Letters Patent is hereby corrected as shown below:

Column 1, Line 7, delete "now abandoned".

Signed and Sealed this

Seventeenth Day of March, 1998

*Attest:*

*Attesting Officer*

BRUCE LEHMAN

*Commissioner of Patents and Trademarks*